United States Patent [19]
Thorson et al.

[11] Patent Number: 5,659,796
[45] Date of Patent: Aug. 19, 1997

[54] SYSTEM FOR RANDOMLY MODIFYING VIRTUAL CHANNEL ALLOCATION AND ACCEPTING THE RANDOM MODIFICATION BASED ON THE COST FUNCTION

[75] Inventors: Gregory M. Thorson, Altoona; Steven L. Scott, Eau Claire, both of Wis.

[73] Assignee: Cray Research, Inc., Eagan, Minn.

[21] Appl. No.: 422,072

[22] Filed: Apr. 13, 1995

[51] Int. Cl.$^6$ .............................. G06F 13/00; G06F 13/12
[52] U.S. Cl. ........................................ 395/200.71; 370/409
[58] Field of Search .............................. 395/200.02, 838, 395/858; 370/94.3, 60

[56] References Cited

U.S. PATENT DOCUMENTS

| | | | |
|---|---|---|---|
| Re. 28,577 | 10/1975 | Schmidt | 179/15 BA |
| 4,771,391 | 9/1988 | Blasbalg | 364/514 |
| 4,933,933 | 6/1990 | Dally et al. | 370/60 |
| 5,157,692 | 10/1992 | Horie et al. | 375/38 |
| 5,170,482 | 12/1992 | Shu et al. | 395/800 |
| 5,175,733 | 12/1992 | Nugent | 370/94.3 |
| 5,218,676 | 6/1993 | Ben-Ayed et al. | 395/200 |
| 5,239,545 | 8/1993 | Buchholz | 370/95.3 |
| 5,313,645 | 5/1994 | Rolfe | 395/800 |
| 5,341,504 | 8/1994 | Mori et al. | 395/800 |
| 5,546,549 | 8/1996 | Barrett et al. | 395/309 |
| 5,550,589 | 8/1996 | Shiojiri et al. | 348/387 |

OTHER PUBLICATIONS

"A Neural Strategy For Optimal Multiplexing of Circuit-And-Packet-Switched Traffic", Bolla et al, IEEE, pp. 1324–1330. Feb. 1992.

Robert Gallager, "Scale Factors for Distributed Routing Algorithms", *NTC '77 Conference Record*, 2 (1978).

C.S. Yang et al., "Performance Evaluation of Multicast Wormhole Routing in 2D–Torus Multicomputers", *IEEE*, 173–178 (1992).

J. Yantchev et al., "Adaptive, low latency, deadlock-free packet routing for networks of processors", *IEE Proceedings*, 136, 178–186 (May 1989).

William Dally et al., "Deadlock-Free Message Routing in Multiprocessor Interconnection Networks", *IEEE Transactions on Computers*, C–36, 547–553 (May 1987).

William Dally, "Performance Analysis of k–ary n–cube Interconnection Networks", *IEEE Transactions on Computers*, 39, 775–785 (Jun. 1990).

C.R. Jesshope, P.R. Miller and J.P. Yantchev, *High Performance Communications in Processor Networks*, proc. 16th International Symposium on Computer Architecture at 150–157, May 1989.

D.H. Linder and J.C. Harden, *An Adaptive and Fault Tolerant Wormhole Routing Strategy for k–ary n–cubes*, I.E.E.E. Trans. on Computers, at 2–12, Jan. 1991.

W.J. Dally and H. Aoki, *Deadlock–Free Adaptive Routing in Multicomputer Networks Using Virtual Channels*, I.E.E.E. Transactions on Parallel and Distributed Systems, vol. 4, No. 4, at 466–475, Apr. 1993.

(List continued on next page.)

*Primary Examiner*—Thomas C. Lee
*Assistant Examiner*—Rehana Perreen Krick
*Attorney, Agent, or Firm*—Schwegman, Lundberg, Woessner & Kluth, P.A.

[57] ABSTRACT

A method optimizes routing in a multiprocessor computer system by defining two types of virtual channels having virtual channel buffers for storing messages communicated between processing element nodes in the multiprocessor computer system. A dateline is associated to each type of virtual channel, and messages are restrained from crossing a dateline on its associated type of virtual channel to avoid deadlock. A cost function is defined which is correlated to imbalances in the utilization of the two types of virtual channels. The unrestrained messages are allocated between the two types of virtual channels to minimize the cost function by defining an initial virtual channel allocation, randomly modifying the virtual channel allocation, and accepting the random modification if the modification decreases the cost function, else accepting the modification based on a probability that slowly decreases during the allocating step.

13 Claims, 7 Drawing Sheets

OTHER PUBLICATIONS

C.J. Glass and L.M. Ni, *The Turn Model for Adaptive Routing*, Proc. 19th International Symposium on Computer architecture, at 278–287, May 1992.

J. Duato, *A New Theory of Deadlock–Free adaptive Routing in Wormhole Networks*, I.E.E.E. Transactions on Parallel and Distributed Systems, vol. 4, No. 12, at 1320–1331, Dec. 1993.

Adve , V.S. and M.K. Vernon, "Performance Analysis of Mesh Interconnection Networks with Deterministic Routing," Transactions on Parallel and Distributed Systems, pp. 225–246, Mar. 1994.

Dally W.J., "Virtual Channel Flow Control," Proc. 17th International Symposium on Computer Architecture, pp. 60–68, May 1990.

Kirkpatrick, S., C.D. Gellatt, Jr. and M.P. Vecchi, "Optimization by Simulated Annealing," Science, pp. 671–670, vol. 220, No. 4598, May 1983.

D. Talia, *"Message–Routing Systems for Transputer–Based Multicomputer,"* IEEE Micro, No. 3, pp. 62–72, (Jun. 13, 1993).

K. Bolding; "Non–Uniformities Introducted by Virtual Channel Deadlock Prevention", Technical Report UW CSE–92–07–07, University of Washington, Seattle, WA, (Jul. 12, 1992).

SYSTEM FOR RANDOMLY MODIFYING VIRTUAL CHANNEL ALLOCATION AND ACCEPTING THE RANDOM MODIFICATION BASED ON THE COST FUNCTION

FIELD OF THE INVENTION

The present invention relates generally to the field of high-speed digital data processing systems, and more particularly, to a method of optimizing routing of data within a multiprocessing network to avoid deadlock and improve performance.

BACKGROUND OF THE INVENTION

Multiprocessor computer systems comprise a number of processing element nodes connected together by an interconnect network. The overall performance of the multiprocessor system depends to a large extent upon the interconnect network performance.

The primary cause of interconnect network performance degradation is congestion due to non-uniform communication patterns and random equations in the network. Even when congestion is limited to a very localized set of processing element nodes, the congestion can lead to a significant backup of messages. One technique that has been used to deal with the congestion problems is adaptive routing. Adaptive routing allows packets of data to be dynamically routed around congested areas in the network. Nevertheless, the potential performance advantages of adaptive routing mechanisms add design complexity and introduce the possibility of deadlock if not implemented properly. Furthermore, in a 3-D torus interconnect topology, previous solutions to avoid deadlock have been excessively expensive.

The interconnect network transmits packets of information between nodes. Examples of information possibly contained in a packet are messages, a shared-memory operation, or various forms of data. Packets comprise multiple physical transfer units (phits). A phit is typically the width of a network physical communication link or physical channel between processing element nodes.

Network performance is a function of packet latency and throughput. Packet latency is the time from initiating a packet send until the last phit of the packet is received at its target. The packet throughput is typically measured as the bytes per second per processing element delivered by the interconnect network. Latency and throughput are interdependent and are both dependent upon the communication workload.

Types of Interconnect Networks

First generation multiprocessor systems utilize store-and-forward interconnect networks. Store-and-forward interconnect networks transfer packets as single units from node to node along the path from source to destination. Each node waits to pass the head of a packet onto the next node until the last phit of the packet has been received.

More recent multiprocessor systems utilize interconnect networks using some form of wormhole routing. Wormhole routing interconnect networks route the head of the packet from a node before the tail of the packet is received by that node. The packet is divided into a number of smaller message packets called flow control units (flits), which may be one or more phits. A header flit contains routing information. The header flit is received by a processing element node and examined as to its destination. The header flit is sent on to the next node indicated by the routing algorithm. The remaining flits follow behind the header flit in a train-like fashion. Flow control between nodes is accomplished on a flit-by-flit basis, rather than a packet-by-packet basis as in the store-and-forward interconnect networks. Thus, in wormhole routing, a packet may be partially transmitted across a physical communication link, and then blocked due to a shortage of buffer space in the receiving node.

Worm hole routing significantly reduces packet latency in lightly loaded networks, because the time to transmit the packet onto a link (phits per packet times clock period) is suffered only once per network transversal, rather than once per hop. Wormhole routing also significantly reduces network buffering requirements, as a node is not required to buffer an entire packet.

A problem with wormhole routing, however, is that when a header flit blocks, the remaining flits stall behind the header. These remaining flits may possibly be across multiple links and nodes in the network. A blocked packet may prevent other packets from proceeding, even those that do not want to route through the node at which the header flit is blocked. This can cause significant network degradation, especially in the presence of non-uniform communication patterns.

A third type of interconnect network is a virtual cut-through network. A virtual cut-through interconnect network is similar to wormhole routing networks, except that when a packet blocks a buffer, that buffer must always accept the entire packet. Thus, virtual cut-through routing avoids the problems inherent in the blocking occurring in wormhole routing, but at the cost of additional hardware necessary to buffer all of the blocked packets.

The present application is related to mechanisms for enhancing wormhole routing networks.

Deadlock

Deadlock occurs when cyclic dependencies arise among a set of channel buffers, causing all involved buffers to fill up and block. A primary consideration in the design of interconnect networks and corresponding routing algorithms is avoiding deadlock.

Deadlock situations can be formalized via a channel dependency graph, a directed graph whose nodes represent network channels and whose arcs represent dependencies between channels. An arc exists between channels x and y iff a packet can route directly from channel x to channel y. It can be proven that a network is deadlock free if its channel dependency graph is acyclic.

One simple method to avoid deadlock is to restrict the topology of the interconnect network and/or the routing function used to route packets between the processing element nodes on the interconnect network to remove the possibility of cyclic buffer dependencies. For example, a binary hypercube topology is deadlock-free if the routing function is restricted so that the dimensions are always traversed in increasing order using the e-cube or dimension order routing algorithm. Since at most one hop is made per dimension and no packets route to a lower dimension, there can be no cyclic buffer dependencies. The e-cube routing algorithm can also be used to make an n-dimensional mesh topology deadlock-free, since the opposite-flowing traffic in each dimension uses distinct sets of buffers and the dimensions are traversed in increasing order. The torus topology, however, is not deadlock free when restricted to e-cube routing, because the wrap-around links in the torus topology allow cyclic buffer dependencies to form on a single ring.

In addition, even in meshes, deadlock can arise due to dependencies between request and response packets. Since a node may not be able to accept more request packets until that node has transmitted response packets for previous requests, deadlock can occur if response packets are made to wait behind request packets in the network. An expensive solution to this dependency problem between request and response packets is to use separate physical networks for requests and responses.

Virtual Channels

Virtual channels have been used to avoid deadlock and to reduce network congestion. Each physical channel is broken up into one or more virtual channels. Each virtual channel includes virtual channel buffers to store packets along a virtual path. The virtual channels are multiplexed across common physical channels, but otherwise operate independently. Thus, a blocked packet on a first virtual channel multiplexed across the common physical channel does not block packets behind a second virtual channel multiplexed on the common physical channel.

Adaptive Routing

Adaptive muting has been used to increase multiprocessor computer system performance. Adaptive routing interconnect networks dynamically route packets around congestion in the network. Thus, adaptive routing mechanisms dramatically increase network throughput and lower the sensitivity of the network to variations in communication patterns. Adaptive routing algorithms are characterized as being either minimal or non-minimal. Virtual routing algorithms allow only shortest-distance routing paths between a source node and a destination node. Non-minimal algorithms allow packets to route along alternate paths that increase the total routing distance between the source and destination nodes. Thus, non-minimal algorithms permit adaptive routing in situations where minimal algorithms are constrained to a single path. In this way, non-minimal routing is used to dynamically route around faults in a network. However, non-minimal routing causes network interference between processes in different physical partitions. In addition, non-minimal routing permits livelock situations to occur, because forward progress is not guaranteed. Deadlock avoidance becomes more complicated with non-minimal routing.

Minimal adaptive routing algorithms can be fully adaptive or partially adaptive. Fully adaptive routing allows any of the alternate paths between source and destination, while partially adaptive routing restricts the choices in some manner. For example, a partially adaptive algorithm might require that routing in the positive direction of all dimensions be completed before any routing in the negative direction takes place. In a 2D torus, this results in full adaptability for a packet moving in the +X and +Y directions, but results in deterministic routing for a packet moving in the +X and −Y directions.

Because deadlock must be avoided, adaptive routing algorithms are difficult to implement. As mentioned above, deadlock can be avoided by restricting the topology or routing function in order to remove cycles from the channel dependency graph. By contrast, the goal of adaptive routing is to increase the freedom of the routing function in order to provide a greater number of alternate paths over which a packet may route.

Virtual Channel Allocation

The primary purpose of virtual channels is to eliminate deadlock. Virtual channels also increase network bandwidth since virtual channels provide more opportunities for messages to pass blocked messages. Co-pending U.S. application Ser. No. 08/165,266 filed on Dec. 10, 1993 entitled "MULTIDIMENSIONAL INTERCONNECTION AND ROUTING NETWORK FOR AN MPP COMPUTER" and assigned to Cray Research, Inc., the assignee of the present invention shows that improved virtual channel allocation can reduce the execution time of a particular application that produces random and partitioned-random network traffic. Application Ser. No. 08/165,266 now U.S. Pat. No. 5,583, 990, which is incorporated herein by reference, introduced criteria to evaluate a given virtual channel allocation, and various allocation algorithms that attempted to meet the criteria, such as a partitioned-allocation algorithm. Nevertheless, there is a need for an improved method and system for optimizing virtual channel allocation in parallel processing systems.

SUMMARY OF THE INVENTION

The present invention provides a method of optimizing routing in a multiprocessor computer system having a plurality of processing element nodes being interconnected by physical communication links in an n-dimensional topology. Two types of virtual channels are defined such that each type of virtual channel includes virtual channel buffers assigned to each physical communication links. The virtual channel buffers are capable of storing messages communicated between the processing element nodes over the physical communication links. A dateline is associated to each type of virtual channel, and messages are restrained from crossing a dateline on its associated type of virtual channel to avoid deadlock. A cost function is defined which is correlated to imbalances in the utilization of the two types of virtual channels. Unrestrained messages are allocated between the two types of virtual channels to minimize the cost function by defining an initial virtual channel allocation, randomly modifying the virtual channel allocation, and accepting the random modification if the modification decreases the cost function, else accepting the modification based on a probability that slowly decreases during the allocating step.

The method of the present invention preferably bases the cost function on a predicted traffic distribution of messages though the multiprocessor computer system. Traffic distribution in multiprocessor computer systems are not typically uniform became many jobs are run in partitions. Therefore, the virtual channel allocation according to the present invention preferably accounts for a partitioned workload by allocating according to a hierarchically good assignment.

The method according to the present invention also preferably generates routing information having the modified virtual channel allocation stored therein. Messages are routed between the processing element nodes based on the routing information.

In one embodiment of the present invention the messages are restrained using logical datelines where messages are logically pre-scheduled to virtual channels such that any message that would cross the dateline associated to the first type of virtual channel is pre-scheduled to the second type of virtual channel and any message that would cross the dateline associated to the second type of virtual channel is pre-scheduled to the first type of virtual channel. In an alternative embodiment, the messages are restrained using physical datelines wherein all messages that will be routed across the physical dateline are assigned to the first type of virtual channel, and messages are physically switched from the first type of virtual channel to the second type of virtual channel when a message crosses the physical dateline. An error signal is generated if a message attempts to cross the physical dateline iota the second type of virtual channel.

Another aspect of the present invention provides a multiprocessor computer system including either the logical or the physical datelines for restraining messages from crossing a dateline on its associated type of virtual channel to avoid deadlock. The multiprocessor computer system includes a virtual channel look-up table storing routing information which includes information representing the above calculated virtual channel allocation to minimize the defined cost function correlated to imbalances in the utilization of the two types of virtual channels. The multiprocessor computer system preferably includes a network router coupled to the virtual channel look-up table for transferring the messages through the multiprocessor computer system based on the routing information.

DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

MPP System

Figure 1:
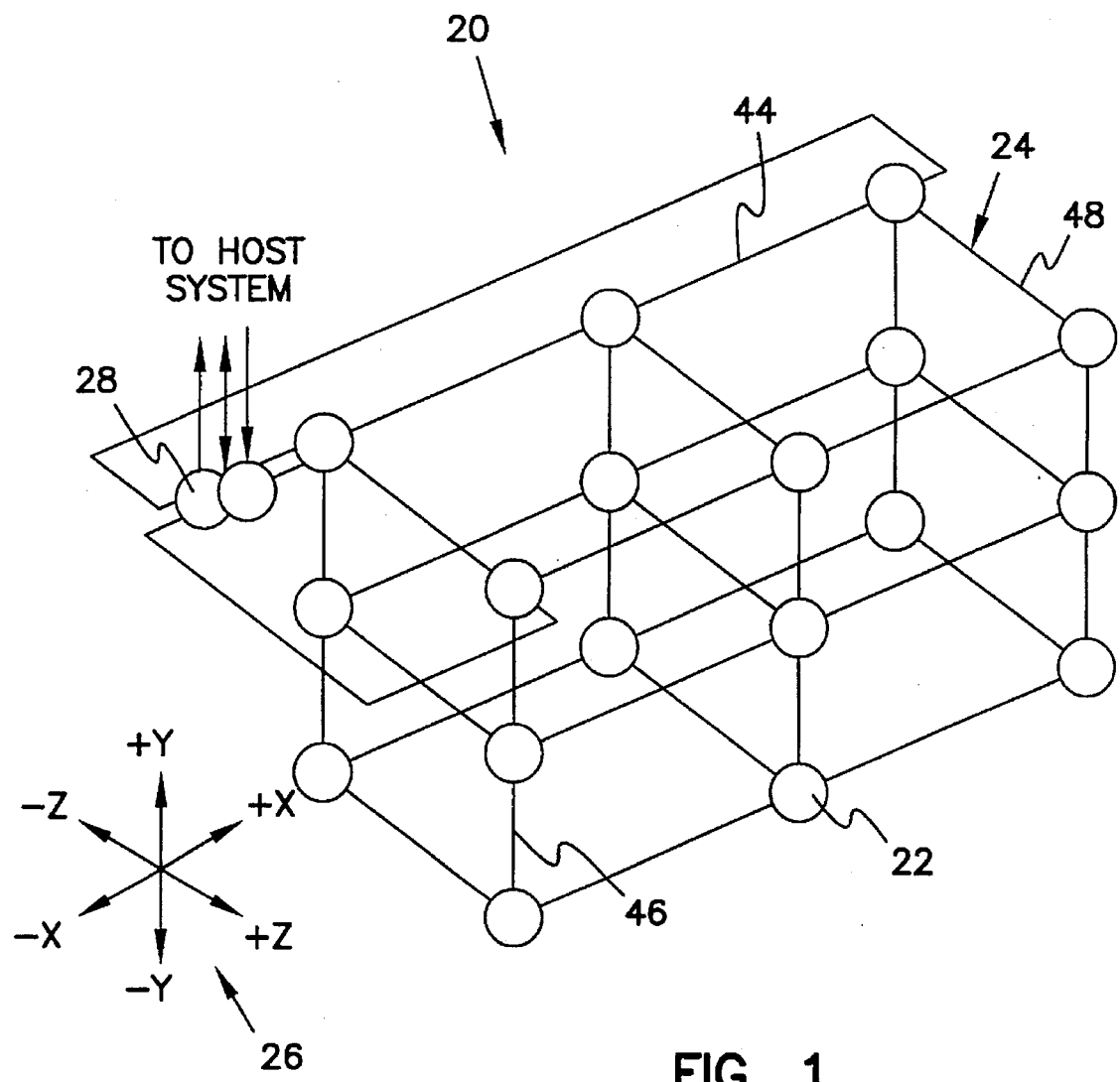
FIG. 1 is a diagram of a massively parallel processing (MPP) system.

FIG. 1 illustrates a simplified model of the components of a massively parallel processing (MPP) system generally indicated at 20. MPP system 20 typically comprises hundreds or thousands of processing element nodes, such as processing element node 22. An interconnect network 24 provides communication paths among the processing element nodes in MPP system 20. In the model of system 20 illustrated in FIG. 1, interconnect network 24 forms a three-dimensional matrix of paths which connect the processing element nodes in the x, y, and z dimensions as indicated by arrows 26. Interconnect network 24 also connects the processing element nodes to an I/O gateway 28. I/O gateway 28 transfers system data and control information between a host system (not shown) and MPP system 20.

The host system runs software compilers for MPP system 20. All software programs written for MPP system 20 are compiled on the host system, but are in MPP system 20. In a single-cabinet configuration, the host system resides in the same cabinet as MPP system 20. In a multiple-cabinet configuration, the host system resides in a separate cabinet that is cabled to MPP system 20.

Figure 2:
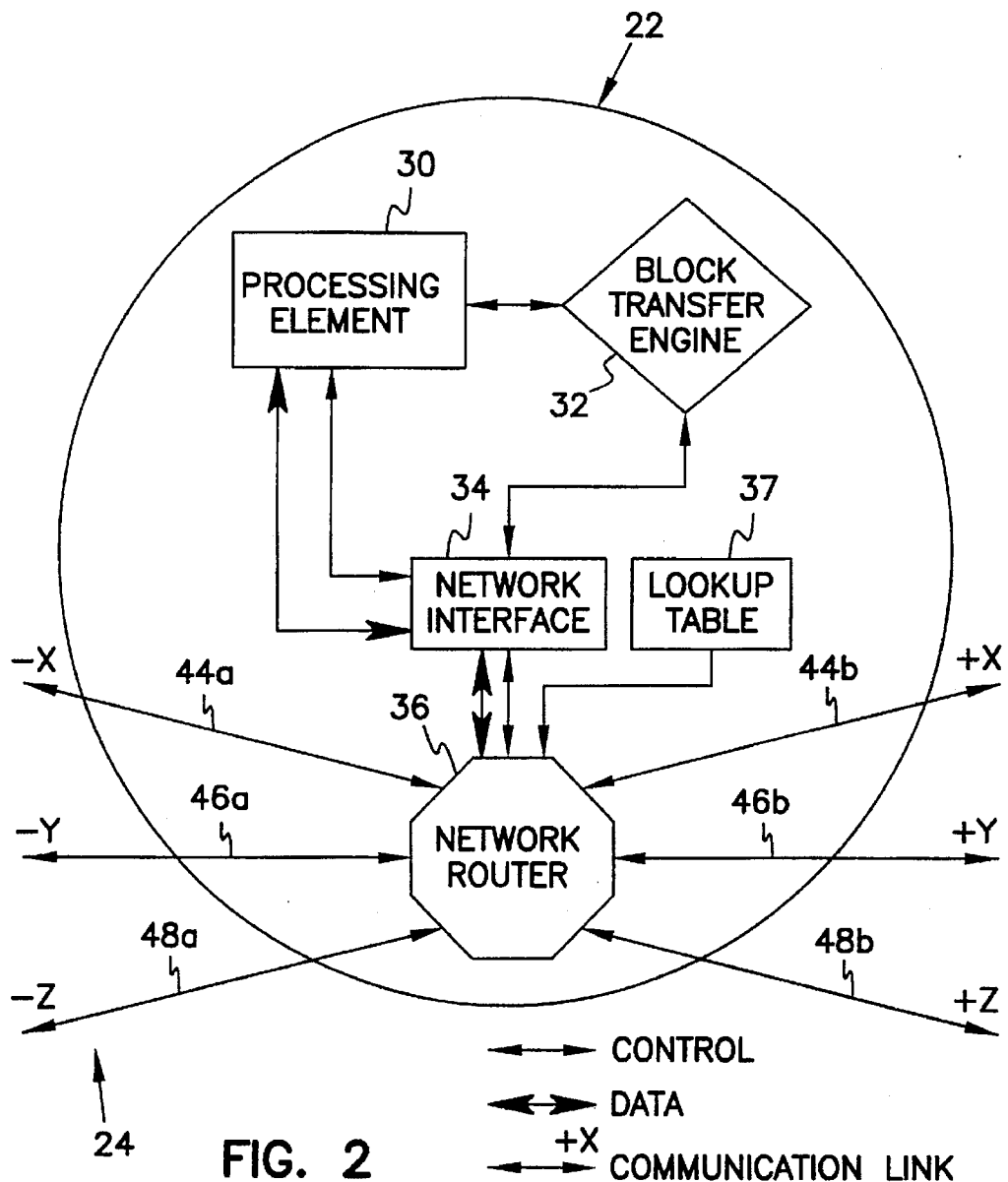
FIG. 2 is a diagram of a processing element node and interconnect network components for the MPP system of FIG. 1.

FIG. 2 provides a more detailed illustration of processing element node 22 and the connection of processing element 22 to interconnect network 24. Each processing element node, such as processing element node 22, typically comprises a processing element 30, a block transfer engine 32, and a network interface 34. Processing element node 22 may comprise more than one processing element 30.

Figure 3:
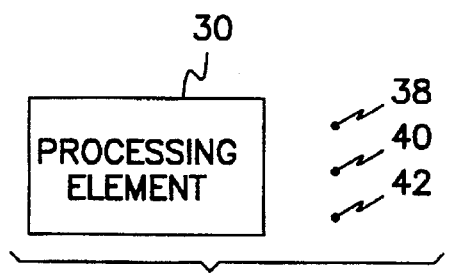
FIG. 3 is a diagram of processing element components for the MPP system of FIG. 1.

As illustrated in FIG. 3, each processing element 30 comprises a microprocessor 38, a local memory 40, and support circuitry 42.

MPP system 20 includes a physically distributed memory, because each processing element contains local memory. Nevertheless, the MPP system memory is also logically shared. System memory is logically shared because the microprocessor in one processing element can access a memory of another processing element without involving the microprocessor in that processing element.

Local memory 40 preferably comprises a dynamic random access memory (DRAM) to store system dam. A low-latency, high-bandwidth data path connects the microprocessor to local memory in processing element 30.

Support circuitry 42 extends the control and addressing functions of microprocessor 38. Support circuitry 42 performs dam transfers to or from local memory 40.

Referring back to FIG. 2, block transfer engine (BLT) 32 is an asynchronous direct memory access controller that redistributes system data. BLT 32 redistributes system data between local memory in processing element 30 and the local memory in remote processing elements. BLT 32 is capable of redistributing data without interrupting processing element 30 or the remote processing elements. In an alternative embodiment of MPP system 20, software controls movement of blocks of data between the local memories of the processing elements.

Network interface 34 formats information to be sent over interconnect network 24 to another processing element node or I/O gateway 28. Network interface 34 also receives incoming information from other processing element nodes or I/O gateway 28 and directs the information to processing element 30.

Interconnect network 24 comprises network routers such as network router 36 illustrated in FIG. 2. In addition, interconnect network 24 comprises physical communication links in each direction of each dimension. X dimension communication links 44 connect nodes in the x dimension. Y dimension communication links 46 connect nodes in the y dimension. Z dimension communication links 48 connect processing element nodes in the z dimension. Representative communication links in each dimension are illustrated in FIG. 1. In addition, FIG. 2 illustrates a communication link 44a in the −X direction, a communication link 44b in the +X direction, a communication link 46a in the −Y direction, a communication link 46b in the +Y direction, a communication link 48a in the −Z direction, and a communication link 48b in the +Z direction.

Communication links 44, 46, and 48 transfer data and control information between the network routers in the interconnect network A communication link typically comprises two unidirectional channels. Each channel in the link preferably contains data, physical unit (phit) type, virtual channel select, and virtual channel acknowledge signals.

Data signals preferably carry either request information or response information. Request information contains information that requests a node to perform an activity. For example, a source node may send a request to a designation node to read data from memory in the destination node. This request is sent over one channel in the communication link. Responses contain information that is a result of an activity. For example, after receiving a request for read data, a destination node sends the response back to the source node. The response contains the read data. Requests and responses are preferably logically separated to avoid deadlock. The logical separation of requests and responses is described below.

Figure 4:
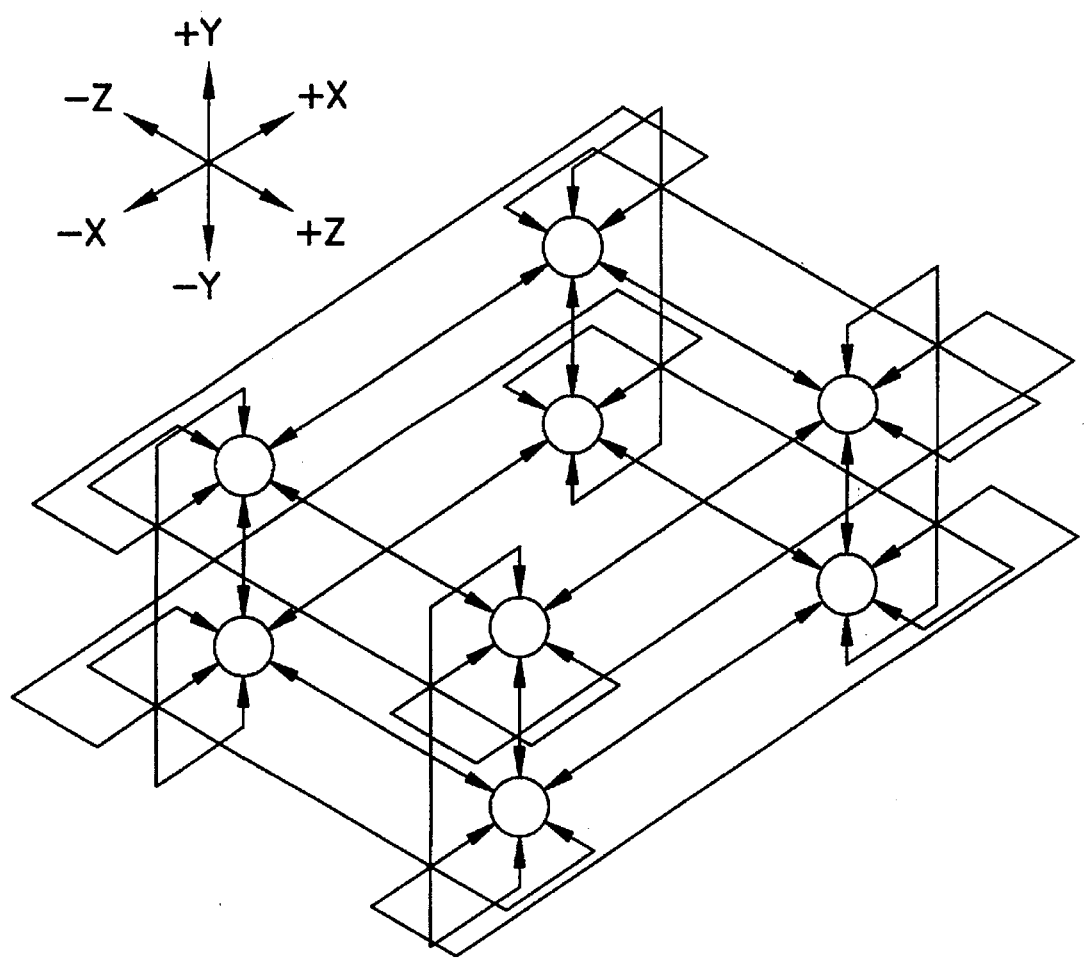
FIG. 4 is a diagram of a MPP system having a three-dimensional torus network topology.

Interconnect network 24 preferably connects the processing element nodes in a bi-directional torus. FIG. 4 illustrates a preferred embodiment of MPP system 20, having a three-dimensional torus network in the x, y, and z dimensions. Each processing element node in the 3-D torus has communication links in both the + and − directions of the x, y, and z dimensions. Several of the other diagrams in the specification show three-dimensional network connections. For clarity, in these other diagrams, the communication links that complete the torus in each dimension are not shown.

In a torus topology, a ring is formed in each dimension where information can transfer from one node, through all of the nodes in the same dimension and back to the original node. Torus networks offer several advantages for network communication, such as increasing the speed of transferring information. Another advantage of the torus network is the ability to avoid bad communication links by sending information the long way around the network.

Information is transferred between the processing element nodes on the communication links in the form of a packet. Each packet preferably comprises a header. The header includes routing information that steers the packet through the network, destination information that indicates which processing element should receive the packet, and control information that instructs the processing element that receives the packet to perform an operation. The header may also contain source information that indicates which processing element created the packet and may contain memory address information. A packet optionally comprises a body. The body of a packet typically includes data to be transferred between processing element nodes or system data from or to the host system.

The network routers, such as network router 36, at each processing element node transfer packets through the communication links in interconnect network 24 based on the routing information contained in each header of each packet. The header and the body have variable links and transfer over the communication links one phit at a time. MPP system 20 uses wormhole routing as defined in the Background section in which routing information is contained in the header flit, and the remaining flits follow behind it in a train-like fashion. Flow control between nodes is accomplished on a flit-by-flit basis, rather than a packet-by-packet basis, so it is possible for a packet to be partially transmitted across a link and blocked due to a shortage of buffer space in a receiving processing element node. As mentioned above, the preferred embodiment of the present invention is a bi-directional 3-D torus network, which further complicates deadlock situations.

Adaptive Routing Mechanism

A preferred adaptive routing mechanism for routing packets through interconnect network 24 utilizing virtual channels multiplexed across common physical communication links, but otherwise operating independently is described in detail in the co-pending and commonly assigned U.S. patent application entitled "ADAPTIVE ROUTING MECHANISM FOR TORUS INTERCONNECTION NETWORK," filed on even date herewith to Steven L. Scott and Gregory M. Thorson, the inventors of the present application, and which is incorporated herein by reference. MPP system 20 preferably utilizes an adaptive routing mechanism using a first subset of virtual channels C1. The C1 virtual channels implement non-adaptive, deadlock-free routing among all nodes. The second type of virtual channel is an NC1 virtual channel. The NC1 channels implement minimal fully adaptive routing. The NC1 virtual channels may have cycles in its channel dependency graph, since packets route freely in the NC1 channels. If at any time a decision would be made that would deadlock in the NC1 virtual channel, then the packet must be able to jump to the C1 virtual channel. Thus, packets in NC1 must always be able to route into a C1 channel.

Figure 5:
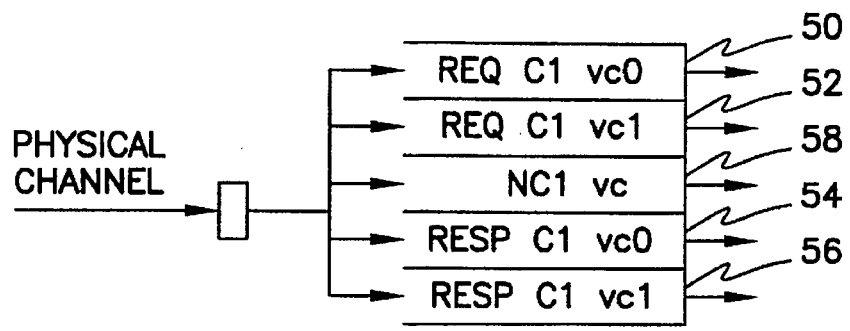
FIG. 5 is a diagram illustrating virtual channels utilized for each network physical communication link or channel of a preferred embodiment of MPP system of FIG. 1.

FIG. 5 illustrates the virtual channels utilized for each network physical channel or physical communication link. Two virtual channels 50 and 52 are used for the C1 virtual request network. Virtual channel 50 is a vc0 type virtual channel, and virtual channel 52 is a vc1 type virtual channel. Similarly, the response C1 virtual network comprises two virtual channels 54 and 56. Virtual channel 54 is a vc0 type virtual channel and virtual channel 56 is a vc1 type virtual channel. The third virtual channel, vc, is the adaptive NC1 virtual channel 58, which provides adaptive routing in both the request and response networks. Although the preferred embodiment illustrated in FIG. 5 uses one NC1 channel, a separate NC1 channel may be used for both the request and response virtual networks.

Figure 6:
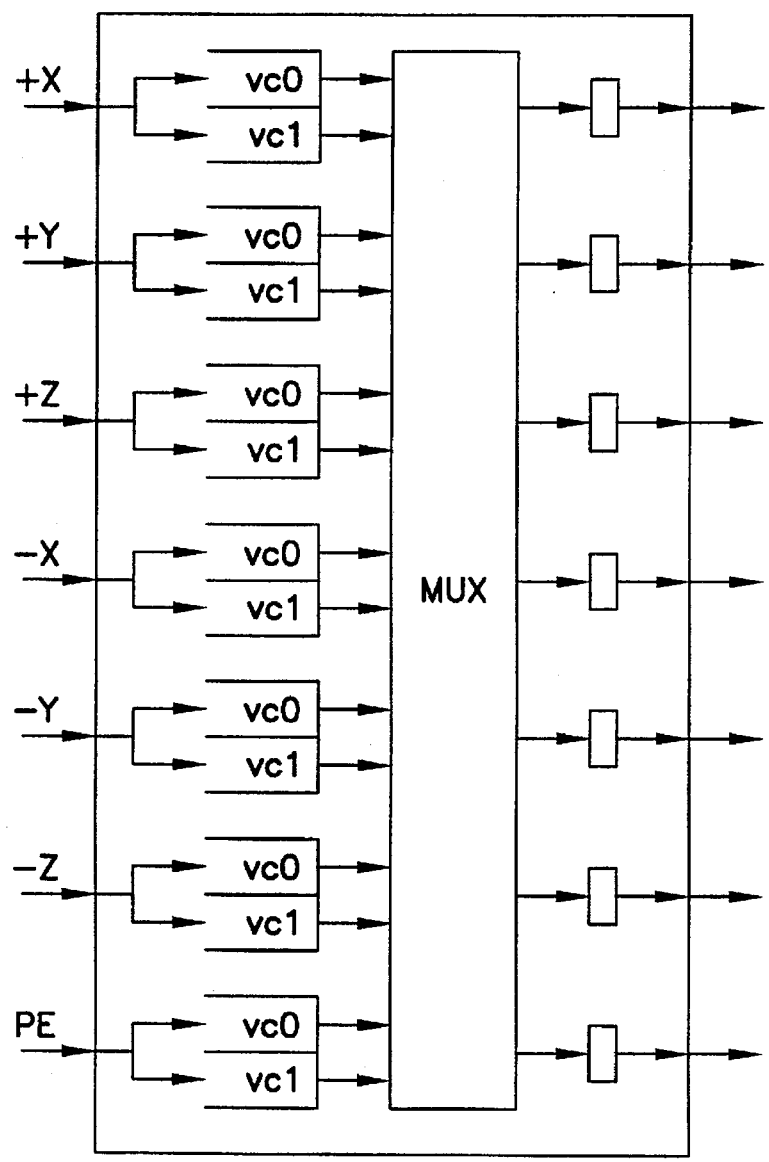
FIG. 6 is a block diagram of a switching mechanism in a 3-D network using virtual channels.

Referring to FIG. 6, each node has an input and output for each of the six directions (+X, −X, +Y, −Y, +Z, −Z) as well as the local processing element (PE). The block diagram of FIG. 6 illustrates switching in the 3D request or response C1 network using virtual channels. Buffers for the virtual channels reside at the processing node inputs at the receiving end of the physical communication link. The sending node on each physical communication link keeps track of the available buffer space for each virtual channel in the receiving processing element node, using flow control information sent on the opposite-direction link.

At any time, a packet in a C1 virtual channel may route to any NC1 virtual channel at the packets's current node that moves the packet closer to its destination (minimally). A packet in an NC1 virtual channel may also route minimally to any NC1 channel at its current node. A packet in an NC1 channel may route to a C1 channel at any time. Upon re-entering the C1 virtual channel network, the packet routes on a physical and virtual channel according to the deterministic C1 routing algorithm, using the current node's virtual channel look-up table. Within either the request or the response C1 virtual channel networks, choosing to begin a route of a packet on the vc0 virtual channel or the vc1 virtual channel and deciding when to change virtual channels during a route of a packet affects both correctness and performance. The primary consideration is correctness (i.e. the allocation of virtual channels between vc0 and vc1 must prevent deadlock).

The following three steps are performed to prevent deadlock in the C1 virtual channels. First, request and response packets are routed on separate sets of virtual channels. This breaks any cycles between request and response traffic. Secondly, direction-order routing is preferably used to break any cycles involving multiple directions. In other words, the packets are routed through a predetermined direction priority, such as (+X, +Y, +Z, -X, -Y, -Z). For example, using the direction order specified above, a route for a +X, -Y, +Z destination would route first +X, then +Z, then -Y. Direction order routing is described in detail in co-pending patent application Ser. No. 07/983,979, filed Nov. 30, 1992, and entitled "DIRECTION ORDER ROUTING IN MULTIPROCESSING SYSTEM" and assigned to Cray Research, Inc., the assignee of the present invention, which is incorporated herein by reference.

The third step to prevent deadlock is the use two virtual channels (vc0 and vc1) to break cycles within each ring. This third step can be achieved in a variety of ways to optimize performance. The method of virtual channel allocation according to the present invention is described in detail below. The vc0 or vc1 virtual channel is selected when a packet begins routing on a ring via routing information stored in a virtual channel look-up table 37 (shown in FIG. 2) based upon the packet's destination on that ring (the coordinate of the destination node in the corresponding dimension). Each processing element node has a small, system-configurable virtual channel look-up table 37 for each of its six directions. Routing in the C1 network is strictly deterministic.

The preferred routing mechanism for routing between C1 and NC1 as described in detail in the above cited and incorporated co-pending and commonly assigned U.S. patent application entitled "ADAPTIVE ROUTING MECHANISM FOR TORUS INTERCONNECTION NETWORK," filed on even date herewith to Steven L. Scott and Gregory M. Thorson, places the following restriction on NC1 channels: no packet may enter an NC1 channel unless the buffer for that channel has room to hold the entire packet. This restriction prevents deadlock from occurring within the NC1 channels because no packet can block in an NC1 channel with its tail blocking the head of a different channel buffer. Since a packet whose head is at the front of an NC1 channel buffer can always route into a C1 virtual channel, deadlock of the NC1 virtual network is impossible. In addition, this restriction removes indirect dependencies between C1 channels. Any packet that enters NC1 can be fully accepted by the first NC1 channel buffer because no packet may enter an NC1 virtual channel unless the buffer for that channel has room to hold the entire packet. Therefore, a packet cannot route from C1 into NC1 and back, and then block with the packer's tail consuming buffer space in the first C1 channel buffer. As a result, the preferred routing mechanism can be used to route packets through any interconnect network topology for which a deadlock-flee deterministic routing algorithm on the C1 channels can be constructed. Preferably, as described above, the deadlock-free deterministic routing algorithm is the direction order routing scheme having two virtual channels assigned to the request network and two virtual channels assigned to the response network.

Virtual Channel Assignments

As previously mentioned, the allocation between vc0 and vc1 on either the request or the response virtual channel networks impacts performance as well as correctness. The balancing of the usage of the virtual channels sharing a physical communication link reduces contention in the network and lowers communication latency and increases network bandwidth. The allocation of the virtual channels must be made to break cycles within each ring to assure that deadlock is avoided in the C1 network.

Figure 7:
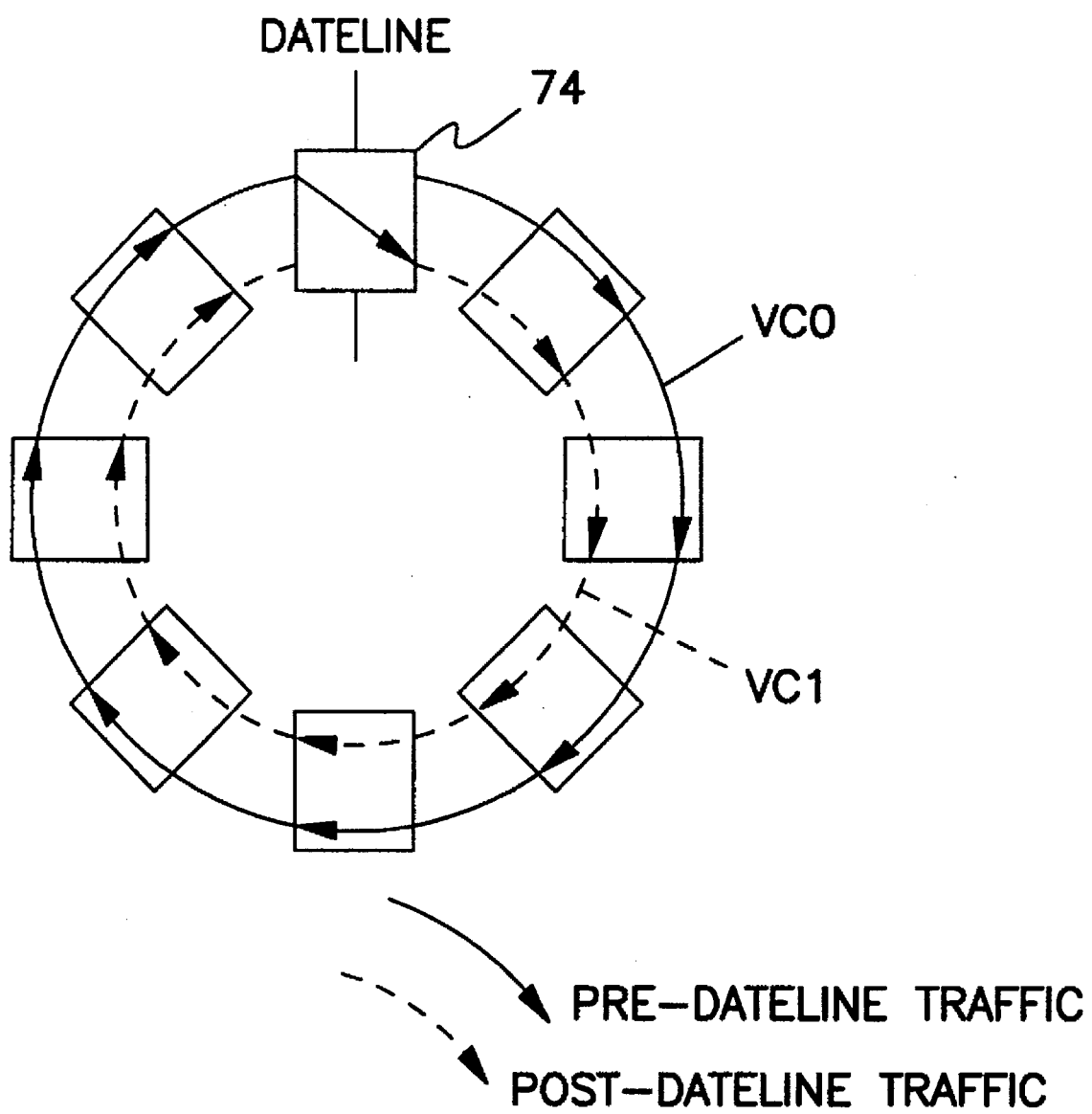
FIG. 7 is a diagram illustrating a time-of-crossing virtual channel assignment for physical cycles.

One method of allocating between virtual channels vc0 and vc1, is the time-of-crossing scheme. Referring to FIG. 7, the time-of-crossing scheme starts all packets on virtual channel vc0. One node on the ring (dateline node 74) transfers any packets that pass through dateline node 74 on the ring onto virtual channel vc1. Since packets never enter and leave dateline node 74 on virtual channel vc0, no cycles are created among the vc0 buffers. Since packets never travel all the way around the ring, no packet ever enters dateline node 74 on virtual channel vc1, and thus no cycles are created among the vc1 buffers. Furthermore, since no packets ever routes from virtual channel vc1 to virtual channel vc0, no cycles are created involving both vc0 and vc1 buffers. Since no packet should ever enter the dateline node from virtual channel vc1, any packet that attempts to cross the dateline on virtual channel vc1 is swallowed by the hardware and an error is flagged.

Another method of allocating between virtual channels vc0 and vc1 is the predicted-crossing scheme. The predicted-crossing scheme does not use a physical dateline node that switches packets between virtual channels. Instead, the predicted-crossing scheme uses a logical dateline node or link to avoid deadlock. In an interconnect network using the predicted-crossing scheme, packets are pre-scheduled such that any packet that will cross the logical dateline node or link given the packet's source node and destination node on the ring uses virtual channel vc0, else the packet uses virtual channel vc1. Packets never switch virtual channels on a given ring. The pre-scheduling based on the logical dateline breaks any cycles among the vc1 buffers. In order for there to be no cycles among the vc0 buffers, packets must never route more than halfway around the ring in the predicted-crossing scheme.

Thus, in the time-of-crossing scheme, the dateline node causes messages traveling on one virtual channel to dynamically switch to another virtual channel. By contrast, in the predicted-crossing scheme the messages must be pre-scheduled on virtual channels so that messages will not cross the logical datelines.

Both the time-of-crossing and the predicted-crossing schemes can be improved by carefully selecting the virtual channels on which packets are routed in order to better balance the virtual channel usage. In another virtual channel allocation scheme referred to as the balanced time-of-crossing scheme, some source nodes on a given ring start their packets on virtual channel vc1 rather than virtual channel vc0 to balance virtual channel usage. These packets remain on virtual channel vc1 if they cross the dateline. Thus, in the balanced time-of-crossing scheme care must be taken in selecting the source nodes that start their packets on virtual channel vc1 so that deadlock is not introduced among the vc1 virtual channels of a ring by this optimization.

The balanced predicted-crossing scheme is a superset of the predicted-crossing scheme that takes advantage of the flexibility introduced by packets that cross neither the dateline nor the reciprocal dateline. In this "don't-care" situation, the virtual channel is chosen in order to maximize the balance between vc0 and vc1 traffic.

The balanced predicted-crossing scheme is able to achieve a better balance than the balanced time-of-crossing scheme. However, the balanced time-of-crossing scheme does not pre-schedule messages. As a result, in the balanced time-of-crossing scheme, the virtual channel assignment information is not carried with the packets, but is instead stored in the interconnect network itself. By contrast, the pre-scheduling required with the balanced predicted-crossing scheme is typically carried with the packet. With the balanced time-of-crossing scheme, the virtual channel allocation is not reloaded with broken node information, because the dateline node physically switches the message between virtual channels vc0 and vc1. Thus, in the balanced time-of-crossing scheme, the virtual channel assignments are typically based on an optimized healthy machine. On the other hand, the pre-scheduling required with the logical dateline node or link typically needs to be reloaded and carried with the packet to take account of broken node information.

With either the balanced time-of-crossing scheme or the balanced predicted-crossing scheme there are various methods to optimize all unrestrained routes. The unrestrained routes are routes of packets that do not cross the dateline in a balanced time-of-crossing scheme and routes of packets that cross neither the dateline nor the reciprocal dateline in the balanced predicted-crossing scheme. The methods of optimizing all unrestrained routes according to the present invention are described in detail in below.

Optimizing Virtual Channel Assignments for Unrestrained Routes

Virtual channel assignments are preferably made based on an assumption of traffic distribution on the ring and a cost function correlated to imbalances in the utilization of virtual channels vc0 and vc1. Optimization of the virtual channel assignments is accomplished by allocating unrestrained packets between virtual channels vc0 and vc1 to minimize the cost function.

The flexibility for optimizing the cost function is increased as the number of unrestrained routes increases. Two techniques are used in the balanced predicted-crossing scheme to maximize the number of unrestrained routes. First, the datelines are placed at nodes rather than links. A route starting or ending at a dateline node does not cross the dateline. As a result all length-one routes are unrestrained. In the second technique, positive datelines are placed at even-numbered nodes having their "half-way-around" traffic sent in the positive direction. Negative datelines are placed on odd-numbered nodes having their "half-way around" traffic sent in the negative direction. The second technique reduces the number of routes that cross datelines.

Figure 8B:
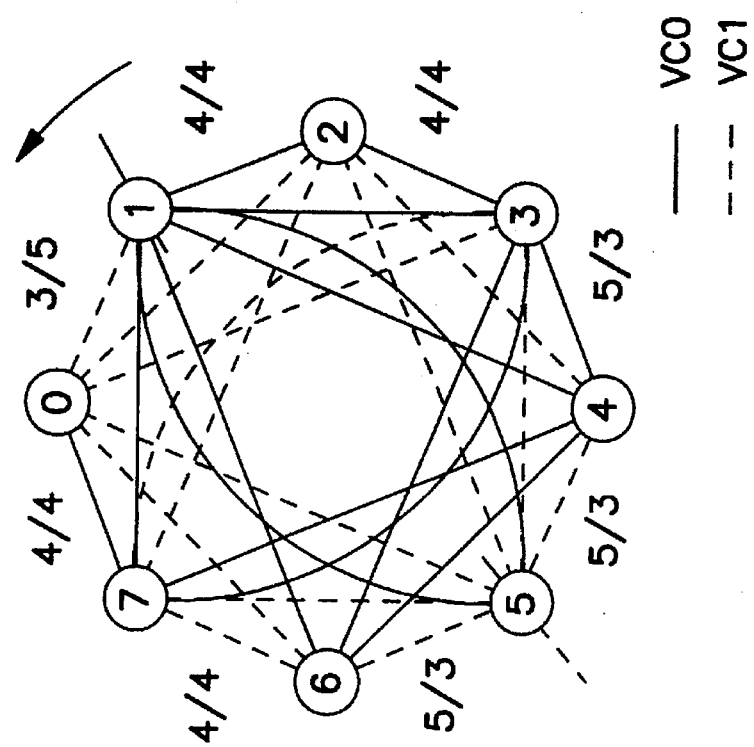
FIGS. 8A and 8B are diagrams of an optimized virtual channel assignment for an 8-node ring.
Figure 8A:
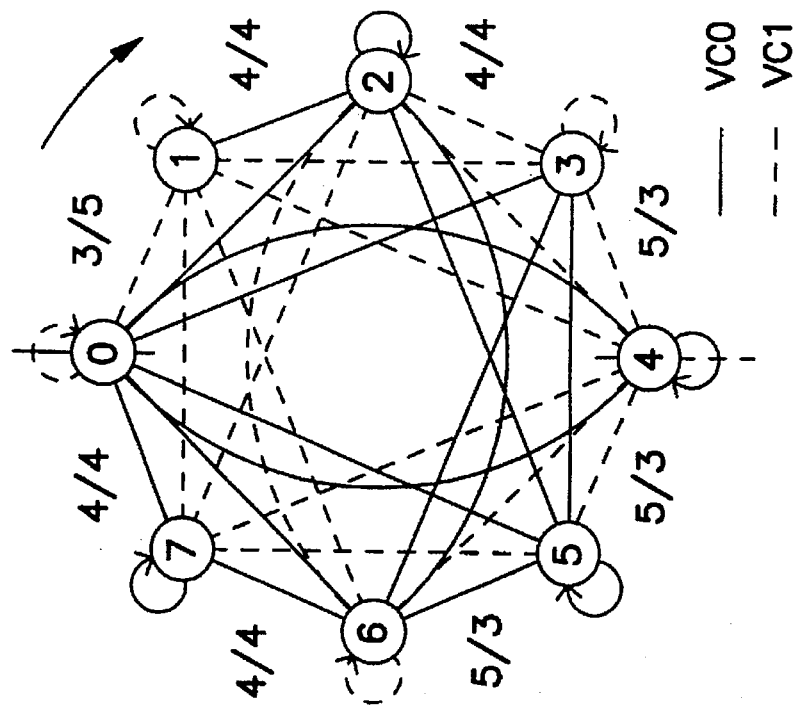
Figure 9B:
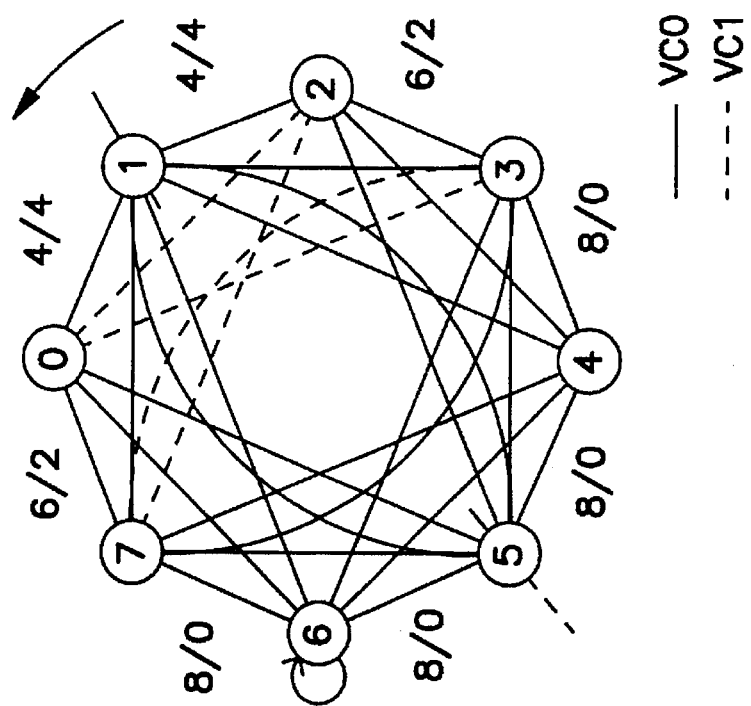
FIGS. 9A and 9B are diagrams of a naive virtual channel assignment for an 8-node ring.

FIG. 8 illustrates an optimized virtual channel assignment for an 8-node ring for a balanced predicted-crossing scheme under the assumption of a uniform traffic distribution. In FIG. 8, routes for each source-destination pair are shown as arcs, with solid lines indicating vc0 type virtual channels and dashed lines indicating vc1 type virtual channels. FIG. 8A illustrates positive and zero-length routes. Zero-length routes cross through a dimension, but do not travel any distance in that dimension. Zero-length routes are always unconstrained, as they do not introduce any dependencies between intra-virtual channel buffers. In FIG. 8A, the vc0 dateline is at node 0 and the vc1 dateline is at node 4. FIG. 8B illustrates negative routes. In FIG. 9B, the vc0 dateline is at node 1 and the vc1 dateline is at node 5.

In the optimized virtual channel assignment illustrated in FIG. 8, virtual channels are assigned to minimize the imbalance cost function, which is calculated as follows. The virtual channel imbalance, representing the absolute difference in vc1 and vc0 traffic divided by the sum of vc1 and vc0 traffic, is computed for each link and each inter-dimension virtual channel buffer. The virtual channels entering and leaving the ring are included in the imbalance calculation. The total imbalance cost function is the sum of the squares of the link and the inter-dimension virtual channel imbalances. The squaring of the individual virtual channel imbalances is performed to avoid bottlenecks by penalizing links that are highly unbalanced.

Figure 9A:
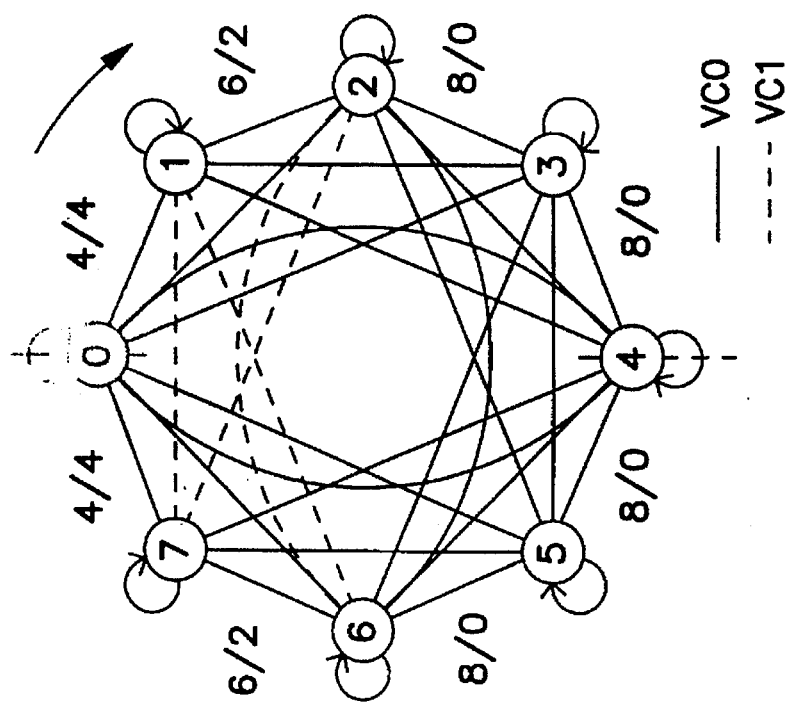

The improvement resulting from the optimized virtual channel assignment is illustrated by comparing FIG. 8 to FIG. 9. FIG. 9 illustrates a naive virtual channel assignment for an 8-node ring. As with FIG. 8, FIG. 9 shows routes for each source-destination pair as arcs, with solid lines indicating vc0 type virtual channels and dashed lines indicating vc1 type virtual channels. FIG. 9A illustrates positive and zero-length routes. In FIG. 9A, the vc0 dateline is at node 0 and the vc1 dateline is at node 4. FIG. 9B illustrates negative routes. In FIG. 9B, the vc0 dateline is at node 1 and the vc1 dateline is at node 5.

The naive assignment is one of the simplest ways to assign virtual channels to avoid deadlock. In the naive assignment, virtual channel vc0 is used unless a packet will cross the vc0 dateline. Virtual channel vc1 is used if the packet will cross the vc0 date line. In other words, all unrestrained routes use vc0. As is illustrated in FIG. 9, the naive assignment results in a very unbalanced virtual channel load under the assumption of uniformly distributed traffic on the ring.

Hierarchically Good Assignments

The above assumption to arrive at the optimized virtual channel assignment illustrated in FIG. 8 that traffic distribution in a MPP system is uniform is likely to be incorrect in practice. More likely, many jobs or tasks will be run in partitions of the MPP system (e.g., a partition of 64 nodes in a 256-node system). When jobs are partitioned, assignment of the virtual channel should be made to optimize the assignment for jobs running in sub-partitions of the machine, as well as for those jobs using the whole machine. This type of virtual channel assignment is referred to as a hierarchically good assignment. FIG. 8 illustrates an optimized global virtual channel balance in isolation which often leads to poor hierarchical virtual channel balance.

In order to achieve good hierarchical balance, the cost function and the assumption of uniform traffic distribution need to be modified. A more realistic assumption of traffic distribution is that some jobs in on the entire ring and other jobs run in smaller partitions of the ring. Partitions are assumed to be naturally aligned-powers of two, and partition of size 2 are ignored. A ring of size 16, for example, might have jobs running in the whole ring, in one of two half-rings, or in one of four quarter-rings.

The cost function for the hierarchical balanced assignment is similar to that used for the globally optimized ring illustrated in FIG. 8, however, the link and inter-dimension imbalances are calculated once for each partition size and then added all together according to a set of weights.

To calculate virtual channel imbalance for a given link and partition size, the absolute difference in the number of vc1 and vc0 routes is divided over that link by the maximum number of routes crossing any link in the partition. For example, the maximum number of routes crossing a link is 32 for a 16-node partition, 16 for a 8-node partition, and 4 for a 4-node partition. A relative imbalance on a link with less traffic is counted less heavily than the same relative imbalance on a more heavily used link. This difference is more pronounced for larger partition sizes.

Similarly, to calculate the virtual channel imbalance for a given interdimension virtual channel buffer and partition size, the absolute difference in the number of vc1 and vc0 routes entering or leaving the ring at that node is divided by the maximum number of routes entering or leaving the ring at any node in the partition. For example, the maximum number of routes entering or leaving the ring at any node is 16 for a 16-node partition, 8 for a 8-node partition, and 4 for a 4-node partition.

Once the individual virtual channel imbalances are computed for all nodes and all partition sizes, the virtual channel imbalances are squared and added together to form the total imbalance cost. Selected coefficients, however, are used to weight the terms according to the type of traffic and partition size for a given them. For example, imbalances leaving the ring at each node are ignored by assigning a weight of zero to these imbalances. As another example, interdimension virtual channel imbalances are weighted less than link virtual channel imbalances for a full partition of 16-nodes to account for the fact that intra-dimension traffic is twice as heavy as inter-dimension traffic for a full partition of 16-nodes. In addition, the various partition sizes can be weighted to account for anticipated uses of the MPP system. For example, if the MPP system is used primarily for small jobs, the size-4 partitions in an 8-node ring are preferably weighted more heavily than the full partition, resulting in a cost function that favors smaller user partitions by being more sensitive to virtual channel imbalance within the size-4 partitions.

In general, virtual channel assignments are possible which greatly improve the subpartition virtual channel balance while having minimal impact on the virtual channel balance for the whole ring. Table 1 at the end of description of the preferred embodiments summarizes the virtual channel imbalances for the naive virtual channel assignment illustrated in FIG. 9; the globally optimized virtual channel assignment with no consideration of partition traffic illustrated in FIG. 8; and the hierarchical optimized virtual channel assignment.

Table 1 shows the average and maximum imbalances for link and inter-dimension virtual channels. Rings of 4, 8, and 16 nodes are shown with subpartition sizes of 4, 8, and 16. For the 8-node ring, results are shown separately for the x/y dimensions and the z dimension. The x/y dimensions ignore traffic leaving the ring while the z dimension accounts for traffic leaving the ring. Results for 16-node ring are shown only for the y dimension. Table 1 illustrates that the globally optimized assignment achieves significantly better balance than the naive assignment for every ring size. The globally optimized assignments, however, results in poor hierarchical balance. For example, for the 4-node partition of a 8-node x/y ring, the average link imbalance is 0.417 and the average inter-dimension virtual channel imbalance is 0.5. For the same 4-node partition of the 8-node x/y ring, the hierarchically optimized assignment achieves an average link imbalance of 0.167 and an average inter-dimension virtual channel imbalance of 0. As illustrated in table 1, the hierarchical assignment significantly improves the subpartition virtual channel imbalance, but does not degrade the full ring virtual channel imbalance for either 8-node ring.

For the 16-node ring the hierarchically optimized assignment has a greater imbalance for the full partition than the globally optimized assignment. Nevertheless, the average full ring virtual channel imbalance is still fairly low and there are no highly unbalanced links or inter-dimension virtual channel buffers. Moreover, the subpartition virtual channel balance is significantly improved. The inter-dimensional virtual channels are perfectly balanced, and the link virtual channels have low average and maximum imbalances.

As mentioned above, a virtual channel assignment is chosen so as to minimize some imbalance cost function. For large rings, however, the search for virtual channel assignment space is prohibitively large to make an exhaustive search to minimize the cost function.

The virtual channel assignment search space is $2^r$ where r is the number of unrestrained routes. The virtual channel assignment space grows exponentially with ring size. For a ring of n nodes, the total number of routes is $n^2$. When n is a multiple of 4, then $r=n(n+4)/2$; the other $n(n-4)/2$ routes cross a dateline, and are thus restrained routes. For example, the virtual channel assignment search space for 8 nodes is $2^{48}$, and the search space for 16 nodes is $2^{160}$. The virtual channel assignment space can be reduced somewhat at the expense of compromising the optimized solution.

One way to reduce the virtual channel assignment space is to assign length-one routes independently after the other routes have been fixed. In other words, for each combination of virtual channels used by routes of length-two and up, all the length-one routes are assigned to minimize the cost function. This assignment is a reasonable compromise, since the virtual channel choice for one length-one route has little effect on the virtual channel of choice of other length-one routes. Nevertheless, even when length-one routes are ignored, the number of unrestrained routes is $r=n^2/2$, which still results in a virtual channel assignment search space of $2^{128}$ for 16 nodes.

Another possible compromise is to assume that the virtual channel assignments are symmetrical with respect to a 180° rotation. For example, all positive routes leaving node 0 are mapped to positive routes of the same length but opposite virtual channel leaving node n/2. This compromise, however, affects the optimal assignment and still leaves a prohibitively large virtual channel assignment search space for rings larger than 8 nodes.

The preferred method according to the present invention for reducing the virtual channel assignment search space is accomplished by using simulated annealing to search for a good virtual channel assignment. Annealing is a physical process where a material is heated and then slowly cooled in order to cure imperfections and reach a well-ordered (low energy) final state. In simulated annealing, the cost function discussed above is analogous to the energy state of a physical material being annealed. An initial virtual channel assignment is defined and then randomly perturbed to modify the virtual channel assignment. A modification of the virtual channel assignment is always accepted if the modification improves the cost function by decreasing the cost function. In other words, analogous to the annealing process for a physical material, the energy state of the cost function is lowered. If the cost function is not improved, a modification is accepted with some probability that depends upon a temperature. The temperature is slowly lowered during the simulated annealing process. An example simulated annealing algorithm is as follows:

```
temp = HOT
repeat
    for tries = 1 to TRIES_PER_TEMP
        pick a random unconstrained route to flip (change VC)
        E = change in cost function from flipping route
        if (E < 0)
            accept the modification
        else
            accept the modification with probability e^(-E/temp)
    flips = number of accepted flips at this temperature
    if flips > 0.6*TRIES_PER_TEMP
        temp = temp/2
    else
        temp = temp * COOL
until flips = 0
```

The initial "hot" stage avoids local minima in the cost function. The virtual channel assignment is "cooled" into a state that is preferably close to the global minimum. The if-statement at the bottom of the repeat-loop controls the speed of the cooling. The virtual channel assignment is rapidly cooled until an "interesting" temperature region is reached. When the interesting temperature region is reached, the virtual channel assignment is then cooled more slowly.

Examples of values for the simulated annealing algorithm are HOT=1; TRIES_PER_TEMP=100$n^2$; and COOL=0.9. With theses values inserted into the simulated annealing algorithm, the virtual channel assignment search space for a 16-node ring is solved in approximately 3 to 5 minutes on a SPARCstation 10 computer, assuming a very gradual rate of cooling.

The simulated annealing algorithm is typically implemented in a software program which is run once for each relative positioning of the positive and negative datelines in order to determine the best placement. Preferably, only odd-numbered nodes are tried for the negative dateline placements to maximize the number of unrestrained routes to thereby achieve better virtual channel balance. A 32-node solution for the above values inserted into the simulated annealing algorithm on a SPARCstation 10 computer requires approximately ½ hour of computing time per negative dateline placement.

The simulated annealing algorithm program needs to be run only once per ring size. The results are preferably stored and utilized in muting information stored in the virtual channel look-up tables 37 (shown in FIG. 2). The vc0 or vc1 virtual channel is selected when a packet begins routing on a ring via the routing information stored in the virtual channel look-up table 37 based upon the packet's destination on that ring. As discussed above, each processing element node has a small, system-configurable virtual channel look-up table 37 for each of its six directions. The virtual channel look-up tables 37 are typically constructed for an arbitrary MPP system configuration. While different MPP system configurations of the virtual channel look-up tables 37 can be used for different MPP systems or workloads or between jobs, typically a machine would use a single default virtual channel look-up table at all times. By using a hierarchically good assignment, the routing information in virtual channel look-up tables 37 work well on a variety of workloads.

The above simulated annealing algorithm and virtual channel assignment was illustrated for logical dateline placements. However, the simulated annealing algorithm can be easily applied with physical datelines to allocate the virtual channels by searching for virtual channel assignment space. In fact, MPP system 20 preferably uses physical datelines and preferably has virtual channels allocated for an optimized healthy MPP system so that the virtual channel look-up tables 37 do not have to be reloaded when bad nodes or physical communication links are configured out of the MPP system.

Conclusion

The routing mechanism according to the present invention preferably provides fully adaptive, deadlock-free routing on a torus of any dimension. Either physical or logical datelines can be used to avoid deadlock. The virtual channel allocation is balanced according to the present invention by using the simulated annealing algorithm having a cost function correlated to a hierarchically good assignment to account for partitioned workloads. The virtual channel allocation is preferably stored and utilized in routing information in virtual channel look-up tables to provide very good virtual channel balance which leads to increased system performance along with deadlock avoidance.

TABLE 1

SUMMARY OF VIRTUAL CHANNEL IMBALANCE FOR 3 ASSIGNMENT METHODS

| Ring Size | Sub-partition Size | Naive Link Imbalance | | Naive Inter-dim Imbalance | | Globally Optimized Link Imbalance | | Globally Optimized Inter-dim Imbalance | | Hierarchically Optimized Link Imbalance | | Hierarchically Optimized Inter-dim Imbalance | |
|---|---|---|---|---|---|---|---|---|---|---|---|---|---|
| | | Avg | Max | Avg | Max | Avg | Max | Avg | Max | Avg | Max | Avg | Max |
| 4 | 4 | 1.0 | 1.0 | 1.0 | 1.0 | 0 | 0 | 0 | 0 | 0 | 0 | 0 | 0 |
| 8 | | .625 | 1.0 | .75 | 1.0 | .063 | .250 | 0 | 0 | .063 | .250 | 0 | 0 |
| x/y | 4 | .833 | 1.0 | 1.0 | 1.0 | .417 | 1.0 | .500 | .500 | .167 | .250 | 0 | 0 |
| 8 | 8 | .615 | 1.0 | .75 | 1.0 | .125 | .250 | 0 | 0 | .125 | .250 | 0 | 0 |
| z | 4 | .833 | 1.0 | 1.0 | 1.0 | .333 | .750 | .313 | 1.0 | .167 | .250 | 0 | 0 |
| 16 | 16 | .625 | 1.0 | .625 | 1.0 | .203 | .563 | 0 | 0 | .266 | .563 | .219 | .375 |
| y | 8 | .661 | 1.0 | 1.0 | 1.0 | .359 | .750 | .500 | .750 | .074 | .313 | 0 | 0 |
| | 4 | .833 | 1.0 | 1.0 | 1.0 | .416 | 1.0 | .500 | .500 | .167 | .250 | 0 | 0 |

What is claimed is:

1. A method of optimizing routing in a multiprocessor computer system having a plurality of processing element nodes being interconnected by physical communication links in an n-dimensional topology, the method comprising:

defining two types of virtual channels, each type of virtual channel having virtual channel buffers assigned to each physical communication link and capable of storing messages communicated between the processing element nodes over the physical communication links;

associating a dateline to each type of virtual channel, each dateline representing a communication link between two virtual channel buffers, which completes a cyclic path in their associated type of virtual channel, wherein if messages cross the dateline a cyclic buffer dependency can occur which creates a deadlock;

restraining messages from crossing a dateline on its associated type of virtual channel to avoid deadlock;

defining a cost function correlated to imbalances in the utilization of the two types of virtual channels; and allocating unrestrained messages between the two types of virtual channels to minimize the cost function, the step of allocating comprising:

defining an initial virtual channel allocation, randomly modifying the virtual channel allocation, and accepting the random modification if the modification decreases the cost function, else accepting the modification based on a probability that slowly decreases during the allocating step.

2. The method of claim 1 further comprising the step of predicting a traffic distribution of messages though the multiprocessor computer system, and wherein the cost function is based on the predicted traffic distribution.

3. The method of claim 2 wherein the steps of predicting the traffic distribution and defining the cost function are performed to account for a partitioned workload.

4. The method of claim 1 further comprising the steps of:

generating routing information having the modified virtual channel allocation stored therein; and routing the messages between the processing element nodes based on the routing information.

5. The method of claim 1 wherein the step of restraining includes the step of logically pre-scheduling messages to virtual channels such that any message that would cross the dateline associated to the first type of virtual channel is pre-scheduled to the second type of virtual channel and any message that would cross the dateline associated to the second type of virtual channel is pre-scheduled to the first type of virtual channel.

6. The method of claim 1 wherein one dateline is associated to both types of virtual channels, and wherein the step of restraining includes the steps of:

assigning all messages that will be routed across the one dateline to the first type of virtual channel; and switching the messages from the first type of virtual channel to the second type of virtual channel when a message crosses the one dateline.

7. The method of claim 6 further comprising the step of providing an error signal if a message attempts to cross the one dateline from the second type of virtual channel.

8. A multiprocessor computer system comprising:

a plurality of processing element nodes;

physical communication links interconnecting the processing element nodes in an n-dimensional topology;

two types of virtual channels, each type of virtual channel having virtual channel buffers assigned to each physical communication link and capable of storing messages communicated between the processing element nodes over the physical communication links, wherein a dateline is associated with each type of virtual channel, each dateline representing a communication link between two virtual channel buffers, which complete a cyclic path in their associated type of virtual channel wherein if messages cross the dateline a cyclic buffer dependency can occur which creates a deadlock;

means for restraining messages from crossing a dateline on its associated type of virtual channel to avoid deadlock; and means for assigning unrestrained messages between the two types of virtual channels based on calculated virtual channel allocation information which minimizes a defined cost function correlated to imbalances in the utilization of the two types of virtual channels by defining an initial virtual channel allocation and randomly modifying the initial virtual channel allocation, wherein the random modification is accepted if the modification decreases the cost function, and is otherwise accepted based on a probability that slowly decreases during the allocating step.

9. The multiprocessor computer system of claim 8 wherein the means for assigning unrestrained messages comprises a virtual channel look-up table, wherein routing information in said virtual channel look-up table includes the calculated virtual channel allocation information.

10. The multiprocessor computer system of claim 9 further comprising a network router coupled to the virtual channel look-up table for transferring the messages through the multiprocessor computer system based on the routing information.

11. The multiprocessor computer system of claim 8 wherein the means for restraining includes means for logically pre-scheduling messages to virtual channels such that any message that would cross the dateline associated to the first type of virtual channel is pre-scheduled to the second type of virtual channel and any message that would cross the dateline associated to the second type of virtual channel is pre-scheduled to the first type of virtual channel.

12. The multiprocessor computer system of claim 8 wherein one dateline is associated to both types of virtual channels, and wherein the means for restraining includes:

means for assigning all messages that will be routed across the one dateline to the first type of virtual channel; and switching means for physically switching the messages from the first type of virtual channel to the second type of virtual channel when a message crosses the one dateline.

13. The multiprocessor computer system of claim 12 further comprising means for providing an error signal if a message attempts to cross the one dateline from the second type of virtual channel.

* * * * *

UNITED STATES PATENT AND TRADEMARK OFFICE
CERTIFICATE OF CORRECTION

PATENT NO. : 5,659,796
DATED : August 19, 1997
INVENTOR(S) : Thorson et al.

It is certified that error appears in the above-indentified patent and that said Letters Patent is hereby corrected as shown below:

On cover page, insert therefor --FOREIGN PATENT DOCUMENTS--

On cover page, under FOREIGN PATENT DOCUMENTS insert therefor -- 0570729 4/1993 Europe--

In column 3, line 27, please delete "muting" and insert --routing-- therefor.

In column 15, Table 1, please delete "615" and insert --625-- therefor.

Signed and Sealed this

Eleventh Day of November, 1997

Attest:

BRUCE LEHMAN

Attesting Officer

Commissioner of Patents and Trademarks